United States Patent
Baweja et al.

(10) Patent No.: US 11,580,561 B1
(45) Date of Patent: Feb. 14, 2023

(54) DETECTING SECURITY BREACHES WITH WATCHDOG TRANSACTION ACCOUNTS

(71) Applicant: AMERICAN EXPRESS TRAVEL RELATED SERVICES COMPANY, INC., New York, NY (US)

(72) Inventors: Aman Baweja, New Delhi (IN); Krishnendu Das, Gurgaon (IN); Susan K. Gluch, Mesa, AZ (US); Rajat Jain, Scottsdale, AZ (US); Abhishek Jha, Scottsdale, AZ (US); Rama Krishna Avinash Varma Kakarlapudi, Scottsdale, AZ (US); Sulabh Monga, Scottsdale, AZ (US)

(73) Assignee: American Express Travel Related Services Company, INC., New York, NY (US)

( * ) Notice: Subject to any disclaimer, the term of this patent is extended or adjusted under 35 U.S.C. 154(b) by 302 days.

(21) Appl. No.: 16/919,875

(22) Filed: Jul. 2, 2020

(51) Int. Cl.
*G06Q 30/00* (2012.01)
*G06Q 30/018* (2023.01)
(Continued)

(52) U.S. Cl.
CPC ....... *G06Q 30/0185* (2013.01); *G06Q 10/107* (2013.01); *G06Q 20/385* (2013.01); *G06Q 20/40* (2013.01); *G06Q 20/4016* (2013.01); *G06Q 30/0633* (2013.01); *G06Q 40/02* (2013.01); *G06Q 50/265* (2013.01)

(58) Field of Classification Search
CPC .. G06Q 30/0185; G06Q 20/385; G06Q 20/40; G06Q 20/4016; G06Q 30/0633
See application file for complete search history.

(56) References Cited

U.S. PATENT DOCUMENTS 7,580,898 B2 *  8/2009  Brown ................. G07F 7/1083
                                                      705/50
7,584,153 B2 *  9/2009  Brown ................. G07F 7/1008
                                                      705/50
(Continued)

OTHER PUBLICATIONS

I. Sakharova, "Payment card fraud: Challenges and solutions," 2012 IEEE International Conference on Intelligence and Security Informatics, 2012, pp. 227-234, doi: 10.1109/ISI.2012.6284315.*

(Continued)

*Primary Examiner* — Steven S Kim
(74) *Attorney, Agent, or Firm* — Thomas | Horstemeyer, LLP (57) ABSTRACT

Disclosed are various embodiments for detecting security breaches using watchdog transaction accounts. A security agent can initiate a purchase with a first electronic commerce system and provide a watchdog transaction account as payment for the purchase. The security agent can then store a record of the purchase which includes a merchant identifier for the merchant and the watchdog transaction account. Subsequently, a transaction authorization system can determine that authorization for a transaction with second electronic commerce system failed. If the transaction authorization system determines that the account used in the transaction with the second electronic commerce system, then the transaction authorization system can determine that the first electronic commerce system has suffered a security breach.

20 Claims, 4 Drawing Sheets

(51) Int. Cl.
*G06Q 40/02* (2023.01)
*G06Q 30/0601* (2023.01)
*G06Q 20/38* (2012.01)
*G06Q 10/107* (2023.01)
*G06Q 50/26* (2012.01)
*G06Q 20/40* (2012.01)

(56) References Cited

U.S. PATENT DOCUMENTS

| | | | | |
|---|---|---|---|---|
| 7,996,288 | B1* | 8/2011 | Stolfo | G06Q 20/385 |
| | | | | 705/38 |
| 8,423,467 | B1* | 4/2013 | Johansson | G06Q 40/00 |
| | | | | 705/44 |
| 10,296,918 | B1* | 5/2019 | Cohen | G06Q 30/0185 |
| 10,523,681 | B1* | 12/2019 | Bulgakov | H04L 63/102 |
| 10,825,028 | B1* | 11/2020 | Kramme | G06Q 20/102 |
| 11,062,248 | B1* | 7/2021 | Cuan | G06Q 50/265 |
| 2007/0136211 | A1* | 6/2007 | Brown | G06Q 20/385 |
| | | | | 705/75 |
| 2007/0255657 | A1* | 11/2007 | Brown | G06Q 20/105 |
| | | | | 705/41 |
| 2009/0254447 | A1* | 10/2009 | Blades | G06Q 30/0601 |
| | | | | 705/40 |
| 2011/0106659 | A1* | 5/2011 | Faith | G06Q 20/10 |
| | | | | 705/44 |
| 2013/0160116 | A1* | 6/2013 | Martin | G06F 16/24568 |
| | | | | 726/22 |
| 2013/0263226 | A1* | 10/2013 | Sudia | H04L 63/08 |
| | | | | 726/4 |
| 2016/0217470 | A1* | 7/2016 | Gerard | G06Q 20/1085 |
| 2017/0024828 | A1* | 1/2017 | Michel | G06Q 40/12 |
| 2018/0191750 | A1* | 7/2018 | Moradi | G06F 21/60 |
| 2019/0311361 | A1* | 10/2019 | Kumar | G06Q 20/4015 |
| 2020/0074471 | A1* | 3/2020 | Adjaoute | G06Q 40/12 |
| 2020/0153836 | A1* | 5/2020 | Johnson | H04L 63/1416 |
| 2020/0211022 | A1* | 7/2020 | Allbright | H04L 63/10 |
| 2021/0133741 | A1* | 5/2021 | Spiegel | G06Q 20/20 |
| 2021/0357941 | A1* | 11/2021 | Fort | G06Q 50/265 |

OTHER PUBLICATIONS

J. Vimala Devi and K. S. Kavitha, "Fraud Detection in Credit Card Transactions by using Classification Algorithms," 2017 International Conference on Current Trends in Computer, Electrical, Electronics and Communication (CTCEEC), 2017, pp. 125-131, doi: 10.1109/CTCEEC.2017.8455091.*

S. J. Pon, S. S. Ramya, A. V. Christal and k. Mythili, "Secured payment gateway for authorizing E-commerce websites and transactions using Machine Learning Algorithm," 2020 International Conference on Computer Communication and Informatics (ICCCI), 2020, pp. 1-5, doi: 10.1109/ICCCI48352.2020.9104140.*

* cited by examiner

DETECTING SECURITY BREACHES WITH WATCHDOG TRANSACTION ACCOUNTS

BACKGROUND

Malware often targets businesses in order to steal customer data. For example, malware may be installed on point-of-sale (PoS) terminals or inserted into the checkout page for a store's web site in order to capture customer payment information when it is supplied by the user. For example, malware inserted into the checkout page of a store's web site could be used to collect a customer's name, credit or debit card account information, billing address, etc. Unfortunately, a merchant may not notice the theft of customer data for some time.

However, financial institutions may suspect that a merchant has suffered a security breach. For example, a bank may notice a sudden surge in fraudulent charges (e.g., because a transaction is declined, a transaction is reported by the customer as unauthorized, etc.). While the financial institution may be able to identify merchants where its customers' debit or credit cards were commonly used, this approach often cannot pin-point the source of a data breach. This is because it's quite possible that the cards were commonly used to purchase items from the same set of merchants. In addition, this approach might identify that a security breach has occurred, but it cannot pin-point when the security breach occurred due to the delay between when customer information was stolen and when it's use was detected. Moreover, this approach requires that a large enough volume of fraudulent transactions occur before the bank can identify common points of purchase where the compromised debit or credit card accounts were used.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for financial institutions to detect security breaches of merchants with specificity. Using the disclosed approaches, the financial institution can irrefutably identify a specific merchant as having been breached. In addition, the financial institution can accurately pinpoint the timeframe during which the breach occurred. Moreover, security breaches can be identified more quickly because large data sets are not required in order to identify common points of purchase that might include the merchant that suffered the security breach. As a result, the security of merchant systems can be improved because breaches can be detected more quickly and with more specificity. Therefore, the breach of the merchant system can be remedied more quickly, reducing the number of transaction accounts (e.g., debit or credit card accounts) that are compromised by malware.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
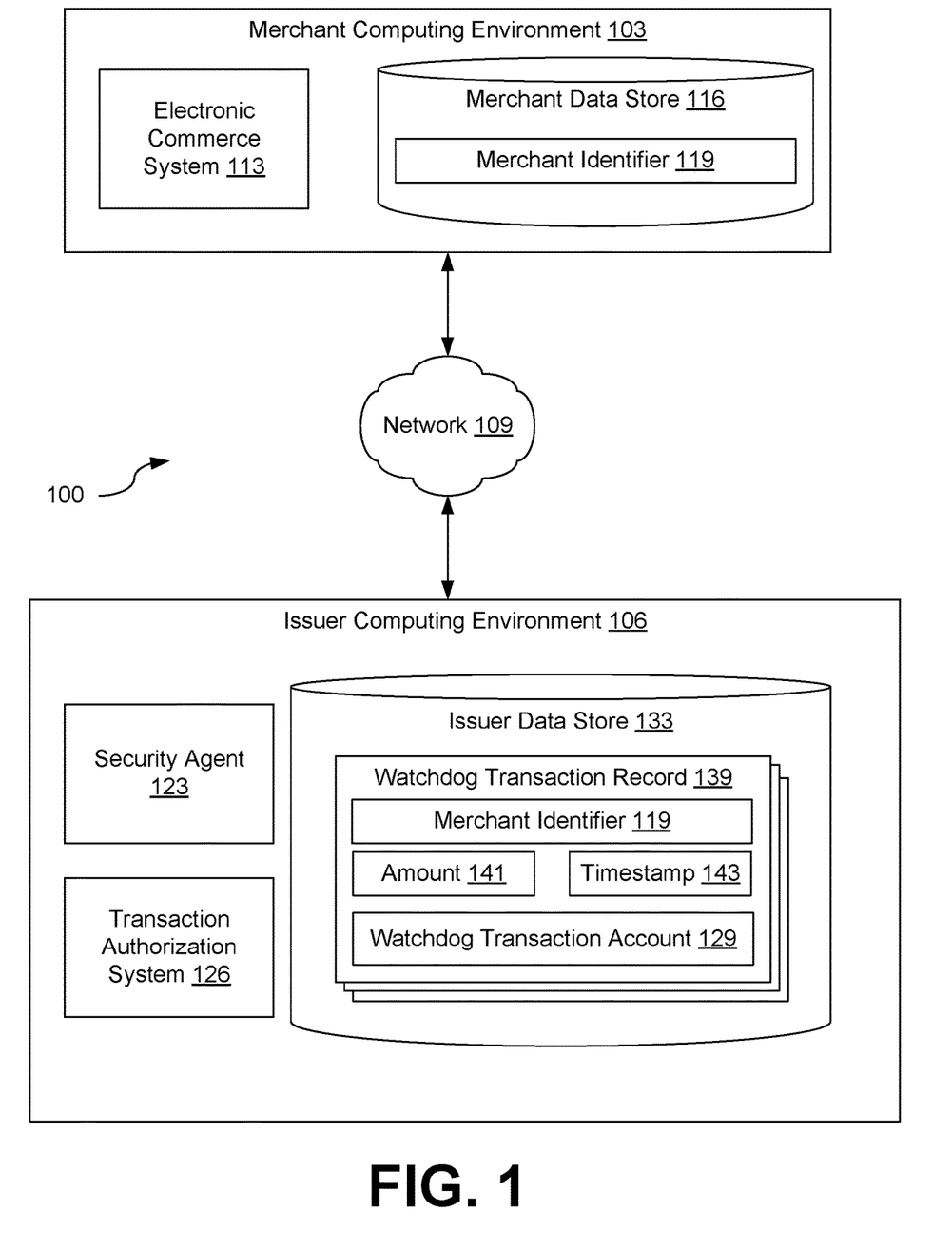
FIG. 1 is a drawing of a network environment according to various embodiments of the present disclosure.

With reference to FIG. 1, shown is a network environment 100 according to various embodiments. The network environment 100 can include a merchant computing environment 103 and an issuer computing environment 106. The merchant computing environment 103 and the issuer computing environment 106 can be in data communication with each other via a network 109.

The merchant computing environment 103 and issuer computing environment 106 can each include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the merchant computing environment 103 and issuer computing environment 106 can each employ a plurality of computing devices that can be arranged in one or more server banks or computer banks or other arrangements. Such computing devices can be located in a single installation or can be distributed among many different geographical locations. For example, the merchant computing environment 103 and issuer computing environment 106 can each include a plurality of computing devices that together can include a hosted computing resource, a grid computing resource or any other distributed computing arrangement. In some cases, the merchant computing environment 103 and issuer computing environment 106 can correspond to an elastic computing resource where the allotted capacity of processing, network, storage, or other computing-related resources can vary over time.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

Various applications or other functionality can be executed in the merchant computing environment 103. For example, the merchant computing environment 103 could host, execute, or otherwise implement an electronic commerce system 113.

The electronic commerce system 113 can be executed in order to facilitate the online purchase of items or services over the network 109. The electronic commerce system 113 also performs various backend functions associated with the online presence of a merchant in order to facilitate the online purchase of items. For example, the electronic commerce system 113 can generate web pages that are provided to clients for the purposes of selecting items for purchase, rental, download, lease, or other form of consumption. These web page may include a checkout or purchase page, or series of pages, in which the customer can supply personally identifying information (e.g., name, billing address, shipping address, etc.) and payment information (e.g., payment type, account information, etc.) in order to complete a purchase or transaction. The electronic commerce system 113 may verify the personally identifying information and the payment information prior to completing the transaction.

Also, various data can also be stored in a merchant data store 116 that is accessible to the merchant computing environment 103. The merchant data store 116 can be representative of a plurality of merchant data store 116, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the merchant data store 116 is associated with the operation of the various applications or functional entities described below. This data can include a merchant identifier 119, and potentially other data.

The merchant identifier 119 can represent any identifier that uniquely identifies the merchant to the issuer with respect to other merchants. Often, the merchant identifier 119 is assigned by the issuer to the merchant. Moreover, the merchant identifier 119 is normally included in any transaction authorization request submitted by the merchant to the issuer. For example, if a merchant were to request that a bank or similar credit or debit card issuer authorize a purchase by a customer, the merchant would include the merchant identifier 119 in a transaction request that includes the customer's personally identifying information (e.g., name on account, etc.) and the customer's payment account information (e.g., billing address, account number, expiration date, etc.). This would allow the bank or issuer to decide whether to authorize payment by the customer with the specified payment account to the merchant.

Various applications or other functionality can be executed in the issuer computing environment 106. These applications can include a security agent 123 and a transaction authorization system 126.

The security agent 123 can be executed to initiate transactions with the electronic commerce system 113 to expose security breaches of the electronic commerce system 113. For example, the security agent 123 may periodically initiate a transaction with the electronic commerce system 113 using a watchdog transaction account 129 to expose security breaches. Additional details of the operation of the security agent 123 are set forth in later paragraphs.

The transaction authorization system 126 can be executed to authorize or decline transactions made by customers with merchants. In the event that a transaction is declined by the transaction authorization system 126, the transaction may be further evaluated to determine if the transaction is indicative of a security breach of the merchant. For example, if the transaction authorization system 126 detects that a watchdog transaction account 129 previously submitted by the security agent 123 is used in a subsequent transaction, then the transaction authorization system 126 could determine that a security breach of the electronic commerce system 113 had resulted in a disclosure of the watchdog transaction account 129 to a third-party.

Also, various data is stored in an issuer data store 133 that is accessible to the issuer computing environment 106. The issuer data store 133 can be representative of a plurality of data stores, which can include relational databases or non-relational databases such as object-oriented databases, hierarchical databases, hash tables or similar key-value data stores, as well as other data storage applications or data structures. The data stored in the issuer data store 133 is associated with the operation of the various applications hosted or executed by the issuer computing environment 106. This data can include one or more watchdog transaction records 139 and potentially other data.

A watchdog transaction record 139 represents a transaction initiated by the security agent 123 with the electronic commerce system 113 of a merchant using a watchdog transaction account 129. As the security agent 123 may monitor the electronic commerce system 113 over an extended period of time, multiple watchdog transaction records 139 may be stored. Each watchdog transaction record 139 would therefore represent a unique transaction initiated by the security agent 123 with a merchant. Accordingly, each watchdog transaction record 139 may include a merchant identifier 119 representing the merchant with whom the transaction occurred. Each watchdog transaction record 139 can also include an amount 141 of the transaction, a timestamp 143 indicating when the transaction was initiated, and a watchdog transaction account 129 used by the security agent 123 for the transaction.

A watchdog transaction account 129 can represent a fictious transaction or payment account that would be declined or denied by the transaction authorization system 126 if presented to the transaction authorization system 126 for payment in a transaction. Although a watchdog transaction account 129 is fictious, in many implementations it will have the properties that a genuine transaction account would be expected to have in order to hide the fact that a transaction account is a fictious watchdog transaction account 129 instead of a genuine account. For example, well-known aliases or pseudonyms may be avoided (e.g., "John Doe," "Jane Doe," "John Q. Public," etc.). As another example, if the watchdog transaction account 129 represents a debit card or credit card, the account number may be successfully validated using the Luhn algorithm. However, if the watchdog transaction account 129 were ever used to attempt payment, the transaction would be rejected by the transaction authorization system 126.

Generally, a unique watchdog transaction account 129 will be used for each transaction initiated by the security agent 123. However, there may only be minor differences between a watchdog transaction account 129 used in a first transaction and a second watchdog transaction account 129 used for a second transaction. For example, a first transaction initiated by the security agent 123 with the electronic commerce system 113 may use a credit card number 1111223233334444 with an expiration date of January, 2023 and a card verification value (CVV) of "789." A second transaction initiated by the security agent 123 could then use the same credit card number and expiration date, but a different CVV. One could then use the differences in the CVV values to subsequently determine which transaction initiated by security agent 123 was compromised. Similarly, changes in the expiration date, account holder name, billing address, or account number itself could be used to differentiate between watchdog transaction accounts 129. Accordingly, a watchdog transaction account 129 may be uniquely identified by the tuple formed from several properties. To use a credit or debit card as an example, a watchdog transaction account 129 could be uniquely identified by the tuple formed from the account number, CVV number, account holder name, and/or billing address.

Next, a general description of the operation of the various components of the network environment 100 is provided. While the following paragraphs illustrate various aspects of the present disclosure, they do not describe the only manner in which the various components may interact with each other. More detailed descriptions of the individual components and how they interact with each other accompany the description of FIGS. 2-4

To begin, the security agent 123 can interact with the electronic commerce system 113 to initiate a transaction using a watchdog transaction account 129. For example, the security agent 123 may crawl one or more web pages provided by the electronic commerce system 113 to add items to a potential order (e.g., by adding items to a shopping cart provided by the electronic commerce system 113). The security agent 123 can then initiate a transaction by attempting to purchase the selected items (e.g., by initiating a checkout process provided by the electronic commerce system 113). Accordingly, the security agent 123 can generate a watchdog transaction account 129 or use a previously created, but unused, watchdog transaction account 129 to attempt to complete the purchase, such as providing the fictious name, account number, billing address, and expiration date of the watchdog transaction account 129. The purchase will then be declined by the transaction authorization system 126 because the information for the watchdog transaction account 129 does not correspond to a valid transaction account (e.g., an issued debit or credit card).

In parallel, the security agent 123 can create a watchdog transaction record 139 associated with the merchant operating the electronic commerce system 113. For example, the security agent 123 can record merchant identifier 119 of the merchant, the amount 141 of the transaction, the timestamp reflecting when the security agent 123 submitted the transaction to the merchant for processing, and the watchdog transaction account 129 used for the transaction. When the transaction initiated by the security agent 123 is declined, the transaction authorization system 126 can evaluate the watchdog transaction records 139 to determine whether a watchdog transaction record 139 exists that has a matching merchant identifier 119, amount 141, timestamp 143, and watchdog transaction account 129. A match would indicate that the transaction being declined is the same transaction recently initiated by the security agent 123 with the electronic commerce system 113. A failure to find a matching watchdog transaction record 119 (e.g., a record with a matching watchdog transaction account 129, but mismatched merchant identifier 119, amount 141, or timestamp) would indicate that the electronic commerce system 113 had been compromised (e.g., by malware, criminals, etc.) and that thief is attempting to use the stolen watchdog transaction account 129 to commit a fraudulent transaction. The detected breach could then be reported to the appropriate individuals, entities, or systems.

Figure 2:
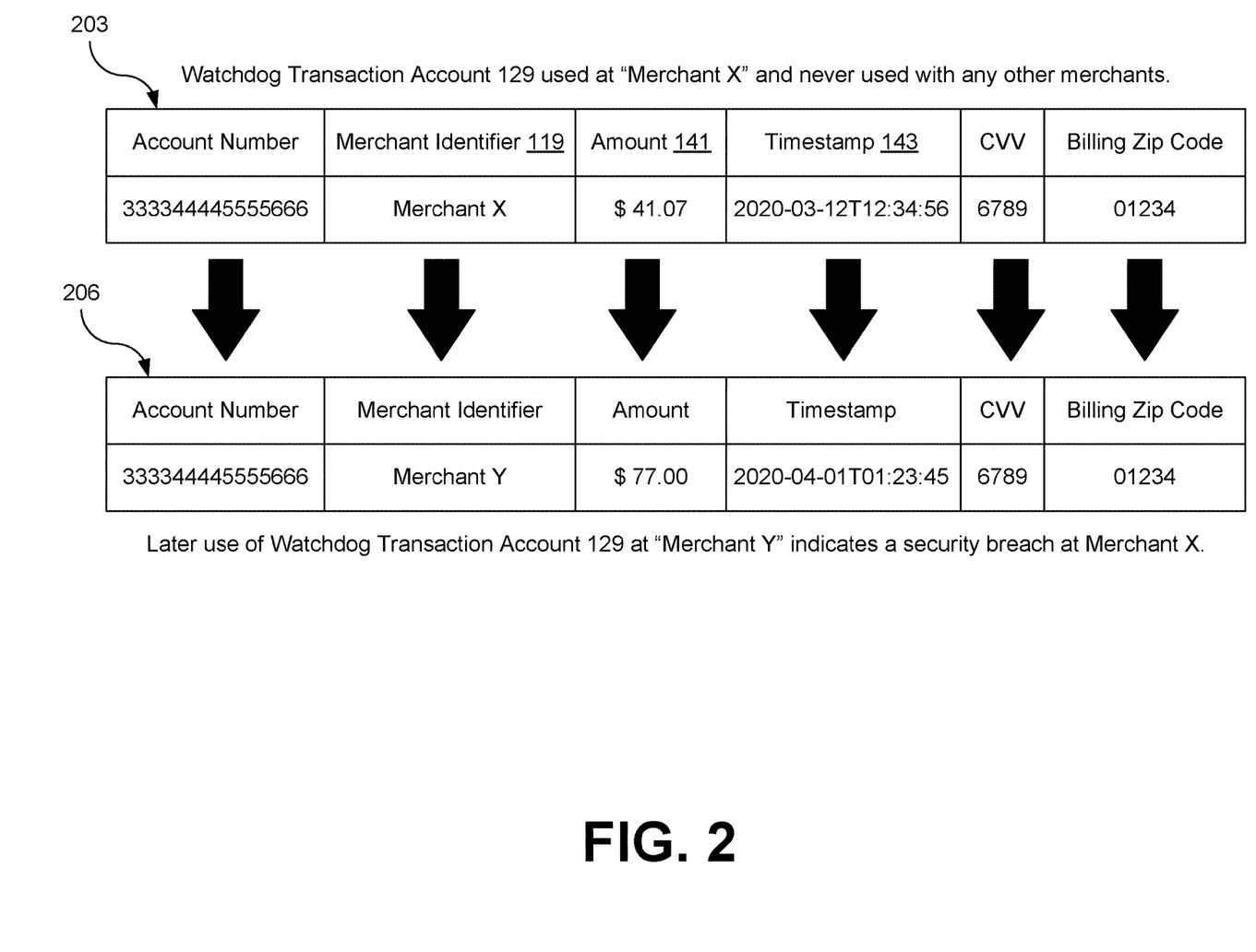
FIG. 2 is an illustration of the principals of the various embodiments of the present disclosure.

FIG. 2 provides a graphical illustration of the principles of the various embodiments of the present disclosure. As illustrated in FIG. 2, a watchdog transaction 203 is initiated with "Merchant X." The watchdog transaction can include an account identifier (e.g., an account number such as a credit or debit card account number), the merchant identifier 119 of "Merchant X," an amount 141 of the watchdog transaction 203, a timestamp 143 of when the watchdog transaction 203 occurred, and authentication information for the watchdog transaction account 129 (e.g., a CVV number, a billing zip code, a billing address, etc.). If the watchdog transaction account 129 is used in a subsequent transaction 206 with "Merchant Y," then one can determine that Merchant X suffered a security breach of their electronic commerce system 113. The timestamp 143 can also be used to help identify the time period in which the security breach occurred, as described in more detail in the discussion of FIG. 4.

Figure 3:
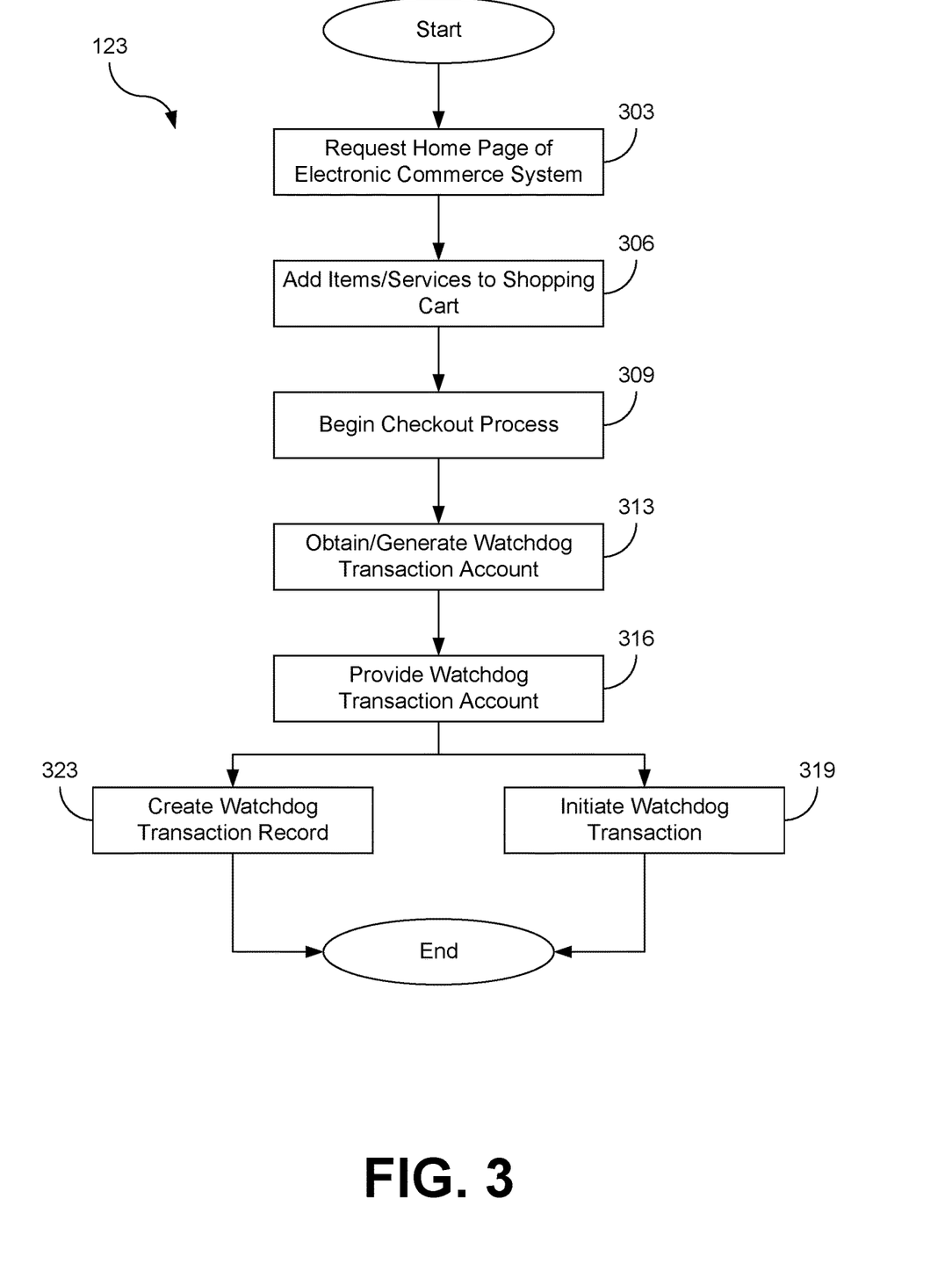
FIG. 3 is a flowchart illustrating one example of functionality implemented as portions of an application executed in the network environment of FIG. 1 according to various embodiments of the present disclosure.

Referring next to FIG. 3, shown is a flowchart that provides one example of the operation of a portion of the security agent 123. The flowchart of FIG. 3 provides merely an example of the many different types of functional arrangements that can be employed to implement the operation of the depicted portion of the security agent 123. As an alternative, the flowchart of FIG. 3 can be viewed as depicting an example of elements of a method implemented within the network environment 100.

Beginning with block 303, the security agent 123 can request a home page of an electronic commerce system 113. The identity or address of the home page may have been previously specified to the security agent 123. For example, a script that causes the security agent 123 to evaluate the electronic commerce system 113 at periodic intervals may have provided the address of the home page as an argument to the security agent 123.

Then at block 306, the security agent 123 can add one or more items or services to a shopping cart or similar purchase request mechanism. For example, the security agent 123 may add an item to a shopping cart that is advertised or displayed on the home page. As another example, the security agent 123 can navigate to an item catalog or similar section of the electronic commerce system 113 and then select one or more items or services to add to the shopping cart. The number of items or services added can be as few as one item or service or as many as desired.

Next at block 309, the security agent 123 can begin the checkout process in order to initiate a watchdog transaction 203. For example, the security agent 123 may request a web page generated by the electronic commerce system 113 that would allow a user to request to purchase the items or service. The requested web page may ask for personally identifying information of the purchaser (e.g., full name, shipping address, etc.) and information for a payment or transaction account (e.g., debit or credit card number, expiration date, CVV code, and/or billing address).

Moving on to block 313, the security agent 123 can generate or obtain a watchdog transaction account 129 for use with the watchdog transaction 203. For example, the security agent 123 may generate a new, unique watchdog transaction account 129 based on a previously used watchdog transaction account 129. For instance, the security agent 123 could change authentication information associated with the watchdog transaction account 129 to generate a new, unique combination of authentication information or data. As an example, the security agent 123 could update or change one or more of an account holder's name, billing address (e.g., house number, street name, city, state, and/or zip code, etc.), CVV or expiration date of a previously used watchdog transaction account 129 to create a new watchdog transaction account 129. The security agent 123 may further search the watchdog transaction records 139 to confirm that the newly created watchdog transaction account 129 does not match a previously used watchdog transaction account 129. As another example, the security agent 123 may request a new watchdog transaction account 129. For example, the security agent 123 may request from an issuing system a new debit or credit card number that has not previously been issued to a customer. The security agent 123 could then create a customer name, billing address, expiration date, and CVV for the new debit or credit card number and save this information in conjunction with the newly issued credit or debit card number as a watchdog transaction account 129. In such an example, the issuing system might mark the unissued credit or debit card number as reserved or unavailable in order to prevent it from being issued to a legitimate customer.

Next at block 316, the security agent 123 can submit the watchdog transaction account 129 to the electronic commerce system 113. For example, the security agent 123 might complete a form provided by the electronic commerce system 113 requesting payment or billing information.

Then at block 319, the security agent 123 can initiate the watchdog transaction 203. For example, the security agent 123 could submit the watchdog transaction account 129 as part of an order or purchase request to the electronic commerce system 113. This could be done in a webform by manipulating a submit or purchase button included in the webpage. This could be similarly accomplished by submitting a hypertext transfer protocol (HTTP) GET or POST request to the electronic commerce system that includes the watchdog transaction account 129, amount 141 of the purchase, and a list of identifiers of items or services to be purchased.

In parallel at block 323, the security agent 123 can create a watchdog transaction record 139 for the watchdog transaction 203 initiated at block 319. The watchdog transaction record 139 can include the amount 141 of the watchdog transaction 203, the merchant identifier 119 of the merchant operating the electronic commerce system, the watchdog transaction account 129 used, and the timestamp 143 reflecting the time at which the watchdog transaction 203 was initiated with the electronic commerce system 113. After the watchdog transaction record 139 is created, it can be stored in the issuer data store 133.

Figure 4:
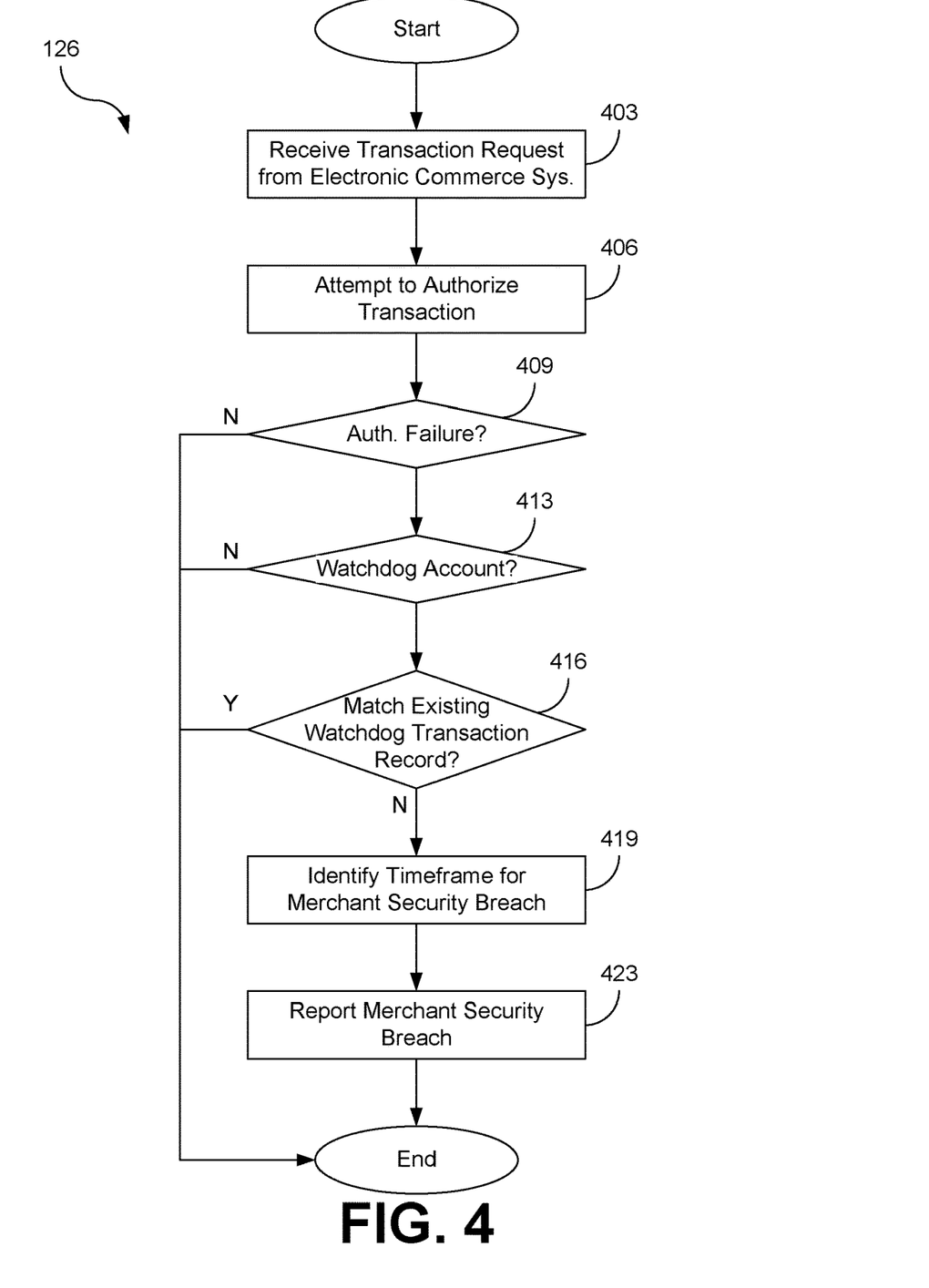
FIG. 4 is a flowchart illustrating one example of functionality implemented as portions of an application executed in the network environment of FIG. 1 according to various embodiments of the present disclosure.

Referring next to FIG. 4, shown is a flowchart that provides one example of the operation of a portion of the transaction authorization system 126. The flowchart of FIG. 4 provides merely an example of the many different types of functional arrangements that can be employed to implement the operation of the depicted portion of the transaction authorization system 126. As an alternative, the flowchart of FIG. 4 can be viewed as depicting an example of elements of a method implemented within the network environment 100.

Beginning with block 403, the transaction authorization system 126 can receive a transaction request from the electronic commerce system 113. The transaction request can represent a request by the electronic commerce system 113 to authorize a purchase made using a transaction account (e.g., credit or debit card account) issued by the entity operating the issuer computing environment 106 (e.g., the "issuer" of the transaction account). The transaction request can include information such as an account identifier (e.g., a credit or debit card number), authentication information (e.g., the name and billing address associated with the account, the expiration date of the account, a CVV or similar authentication number, etc.), a merchant identifier 119, a time that the transaction occurred, and an amount of the transaction. Accordingly, the transaction request could represent a subsequent transaction 206, a watchdog transaction 203, or other types of transactions.

Then at block 406, the transaction authorization system 126 can attempt to authorize the transaction. For example, the transaction authorization system 126 can determine whether the authentication information matches or is appropriate for the account identified by the account identifier. Further, the transaction authorization system 126 may attempt to deduct an amount of funds or available credit from the account identified in the transaction request.

Next at block 409, the transaction authorization system 126 determines whether there was an authorization failure and the reason for the authorization failure. Authorization could occur for any number of reasons, some of which might indicate a security breach while others might indicate other issues. For example, if authorization failed because there were insufficient funds or available credit for the transaction, this would not indicate a security breach. However, if the authorization failed because the account identifier included in the transaction account failed to identify an existing account, this could indicate that a security breach had occurred. If the transaction is successfully authorized, or if authorization failed for a reason other than the account identifier failing to identify an existing account, then the process ends. However, if the authorization fails because the account identifier fails to identify an existing account, then the process proceeds to block 413.

Moving on to block 413, the transaction authorization system 126 can determine whether the account identified in the failed transaction request was a watchdog transaction account 129. For example, the transaction authorization system 126 could search the watchdog transaction records 139 for a matching watchdog transaction account 129. If a matching watchdog transaction account 129 is identified, then the process proceeds to block 416. If no matching watchdog transaction account is identified, then the process ends.

Then at block 416, the transaction authorization system 126 can further analyze the transaction request received at block 403 to determine if it matches a watchdog transaction record 139. This analysis can be performed in order to determine whether the transaction request is the result of a data breach of a merchant, or if the transaction request represents a watchdog transaction 203 initiated by the security agent 123. For example, if the time of the transaction, the merchant identifier 119 for the transaction, and the amount of the transaction match the merchant identifier 119, amount 141, and timestamp 143 of the watchdog transaction record 139, then the transaction authorization system 126 can conclude that the transaction request received at block 403 is the result of a watchdog transaction 203 initiated by the security agent 123. Accordingly, the process would end.

However, if there is a mismatch, then the transaction authorization system 126 could conclude that the transaction request was the result of a security breach. For example, if merchant identifier 119 in the transaction request received at block 403 failed to match the merchant identifier 119 in the watchdog transaction record 139, then the transaction authorization system 126 could conclude that the electronic commerce system 113 where the security agent 123 used the watchdog transaction account 129 had been breached and an attacker was trying to reuse the watchdog transaction account 129 to make a purchase with another merchant. Similarly, if the timestamp 143 or amount 141 listed in the watchdog transaction record 139 failed to match the time or amount of the transaction specified in the transaction request received at block 403, then the transaction authorization system 126 could conclude that the electronic commerce system 113 had been breached and an attacker was attempting to reuse the compromised watchdog transaction account 129 for a subsequent purchase.

Next at block 419, the transaction authorization system 126 can determine the timeframe in which the breach occurred. For example, if a single instance of a compromised watchdog transaction account 129 is identified, then the transaction authorization system 126 could conclude that the breach occurred on or before the time specified in the timestamp 143 for the respective watchdog transaction record 139 of the compromised watchdog transaction account 129. Similarly, if multiple instances of compromised watchdog transaction accounts 129 are identified, then the watchdog transaction record 139 with the oldest timestamp 143 could be used as an identifier for when the security breach occurred.

Finally, at block 423, the transaction authorization system 126 can report the detected breach of the merchant or electronic commerce system identified by the merchant identifier 119 included in the watchdog transaction record 139 for the compromised watchdog transaction account 129. For example, the transaction authorization system 126 could send an email to a predefined email address of a security or incident response team for the compromised merchant. Similarly, the transaction authorization system 126 could send an email to a predefined email address of a security or incident response team for the issuer of the watchdog transaction account. The report or message could include the identity of the merchant who was breached, a copy of the transaction authorization received at block 403, a copy of the watchdog transaction record 139, and a proposed timeframe for when the breach may have occurred. These messages would allow the appropriate personnel to investigate and mitigate the breach. Although email is used as an illustrative example, other notification approaches may also be used. These can include application notifications (e.g., for a dashboard of a security monitoring system), short message service (SMS) messages, etc. Once the security breach is reported, the process can end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

The invention claimed is:

1. A non-transitory, computer-readable medium, comprising:
   a first set of machine-readable instructions that, when executed by a processor of a computing device operated by an entity, cause the computing device to at least:
      crawl one or more web pages provided by a first electronic commerce system to identify a checkout or purchase web page;
      initiate a purchase with the first electronic commerce system using the identified checkout or purchase web page;
      provide a watchdog transaction account to the electronic commerce system as payment for the purchase; and
      store a record of the purchase, the record comprising a merchant identifier associated with the electronic commerce system and the watchdog transaction account; and
   a second set of machine-readable instructions that, when executed by the processor of the computing device operated by the entity, cause the computing device to at least:
      determine that authorization of a transaction with a second electronic commerce system failed;
      identify an account identifier for a transaction account used in the transaction with the second electronic commerce system;
      determine that an account identifier for the transaction account matches the account identifier for the watchdog transaction account stored in the record of the purchase; and
      determine that a security breach occurred in the first electronic commerce system based at least in part on the account identifier for the watchdog transaction account matching the account identifier for the transaction account used in the transaction with the second electronic commerce system.

2. The non-transitory, computer-readable medium of claim 1, wherein the machine-readable instructions further cause the computing device to at least generate the watchdog transaction account.

3. The non-transitory, computer-readable medium of claim 2, wherein the machine-readable instructions that cause computing device to generate the watchdog transaction account further cause the computing device to at least:
   select a previously used account identifier for the respective watchdog transaction account; and
   generate a unique combination of authentication information for the previously used account identifier.

4. The non-transitory, computer-readable medium of claim 2, wherein the machine-readable instructions further cause the computing device to at least search a plurality of previously used watchdog transaction accounts to determine that the generated watchdog transaction account fails to match any of the plurality of previously used watchdog transaction accounts.

5. The non-transitory, computer-readable medium of claim 1, wherein the record further comprises a timestamp representing a date and time that the purchase was initiated.

6. The non-transitory, computer-readable medium of claim 1, wherein the watchdog transaction account represents an unissued debit or credit card account.

7. The non-transitory, computer readable medium of claim 1, wherein the watchdog transaction account has previously been exclusively used with the first electronic commerce system prior to the transaction with the second electronic commerce system.

8. A computer-implemented method, comprising:
crawling, with a computing device operated by an entity, one or more web pages provided by a first electronic commerce system to identify a checkout or purchase web page;
initiating, with the computing device operated by the entity, a purchase with the first electronic commerce system using the identified checkout or purchase web page;
providing, with the computing device operated by the entity, a watchdog transaction account to the first electronic commerce system as payment for the purchase; and
storing, with the computing device operated by the entity, a record of the purchase, the record comprising a merchant identifier associated with the first electronic commerce system and the watchdog transaction account;
determining, with the computing device operated by the entity, that authorization of a transaction with a second electronic commerce system failed;
identifying, with the computing device operated by the entity, an account identifier for a transaction account used in the transaction with the second electronic commerce system;
determining, with the computing device operated by the entity, that the account identifier for the transaction account used in the second transaction matches an account identifier for the watchdog transaction account; and
determining, with the computing device operated by the entity, that a security breach occurred in the first electronic commerce system based at least in part on the account identifier for the watchdog transaction account matching the account identifier for the transaction account used in the transaction with the second electronic commerce system.

9. The method of claim 8, wherein the watchdog transaction account has previously been exclusively used with the first electronic commerce system prior to the transaction with the second electronic commerce system.

10. The method of claim 8, further comprising identifying, with the computing device operated by the entity, a timeframe for the security breach based at least in part on a timestamp of a watchdog transaction record for the watchdog transaction account.

11. The method of claim 10, wherein the transaction with the second electronic commerce system further includes authentication information associated with the transaction account used in the transaction, and the method further comprises:
identifying, with the computing device operated by the entity, a specific watchdog transaction record from a plurality of watchdog transaction records associated with the watchdog transaction account based at least in part on the authentication information, wherein each of the plurality of watchdog transaction account records associated with the watchdog transaction record comprises a unique set of authentication information; and
determining, with the computing device operated by the entity, that the security breach began prior to a time indicated in the timestamp recorded in the specific watchdog transaction record.

12. The method of claim 8, wherein the watchdog transaction account represents an unissued debit or credit card account.

13. The method of claim 8, further comprising sending, with the computing device operated by the entity, a report of the security breach to a predefined recipient.

14. The method of claim 13, wherein the report of the security breach is sent via email.

15. A system, comprising:
a plurality of computing devices operated by an entity, the plurality of computing devices hosting a security agent and a transaction authorization system;
the security agent comprising a first set of machine-readable instructions that, when executed by one or more of the plurality of computing devices operated by the entity, cause the one or more computing devices to at least:
crawl one or more web pages provided by a first electronic commerce system to identify a checkout or purchase web page;
initiate a purchase with the first electronic commerce system using the identified checkout or purchase web page;
provide a watchdog transaction account to the first electronic commerce system as payment for the purchase; and
store a record of the purchase, the record comprising a merchant identifier associated with the first electronic commerce system and the watchdog transaction account; and
the transaction authorization system comprising a second set of machine-readable instructions that, when executed by one or more of the plurality of computing devices operated by the entity, cause the one or more computing devices to at least:
determine that authorization of a transaction with a second electronic commerce system failed;
identify an account identifier for a transaction account used in the transaction with the second electronic commerce system;
determine that the account identifier for the transaction account matches an account identifier for the watchdog transaction account stored in the record of the purchase; and
determine that a security breach occurred in the first electronic commerce system based at least in part on the account identifier for the watchdog transaction account matching the account identifier for the transaction account used in the transaction with the second electronic commerce system.

16. The system of claim 15, wherein the watchdog transaction account has previously been exclusively used with the first electronic commerce system prior to the transaction with the second electronic commerce system.

17. The system of claim 15, wherein the transaction authorization system, when executed by the one or more of the plurality of computing devices operated by the entity, further causes the one or more of the plurality of computing devices to at least identify a timeframe for the security breach based at least in part on a timestamp of the record of the purchase.

18. The system of claim 15, wherein the transaction further includes authentication information associated with the transaction account used in the transaction with the second electronic commerce system, and the transaction authorization system, when executed by the one or more of the plurality of computing devices operated by the entity, further causes the one or more of the plurality of computing devices to at least:
    identifying the record of purchase from a plurality of watchdog transaction records associated with the watchdog transaction account based at least in part on the authentication information, wherein each of the plurality of watchdog transaction account records associated with the watchdog transaction record comprises a unique set of authentication information; and
    determining that the security breach began prior to a time indicated in the timestamp recorded in the record of purchase.

19. The system of claim 15, wherein the security agent, when executed by the one or more of the plurality of computing devices operated by the entity, further causes the one or more of the plurality of computing devices to at least generate the watchdog transaction account.

20. The system of claim 15, wherein the watchdog transaction account represents an unissued debit or credit card account.

\* \* \* \* \*